March 17, 1964   R. E. SHRIMPLIN   3,125,070
DOOR ASSEMBLY FOR SELF-FEEDER STRUCTURE
Filed July 30, 1962
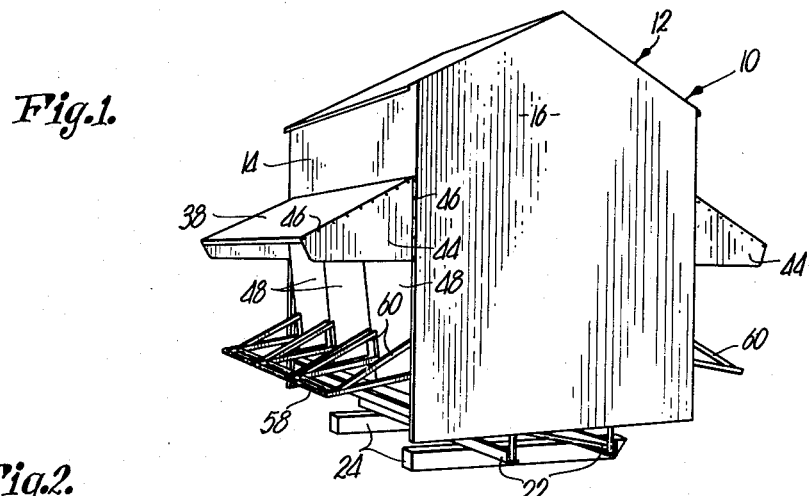
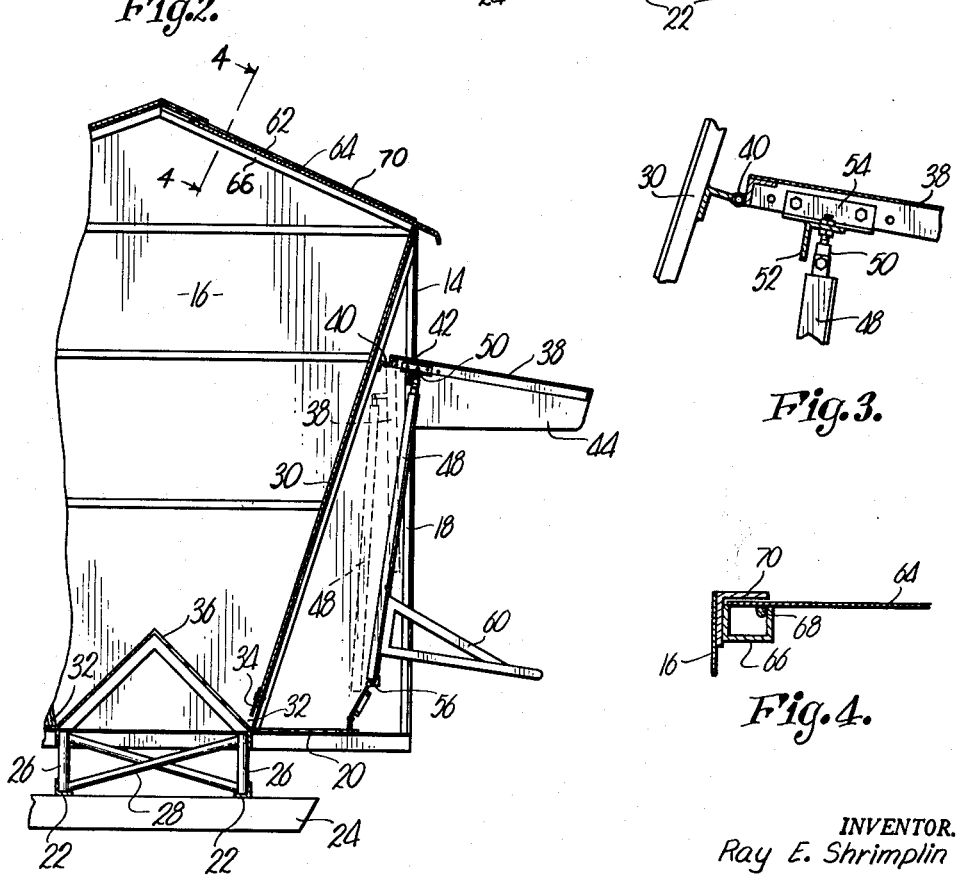
INVENTOR.
Ray E. Shrimplin
BY
Hovey Schmidt, Johnson & Hovey.
ATTORNEYS.

United States Patent Office 3,125,070
Patented Mar. 17, 1964

3,125,070
DOOR ASSEMBLY FOR SELF-FEEDER
STRUCTURE
Ray E. Shrimplin, R.R. 2, Westphalia, Kans.
Filed July 30, 1962, Ser. No. 213,518
2 Claims. (Cl. 119—53.5)

This invention relates to animal feeding means, and more particularly, to a bin for receiving feeding materials, and which can be moved from place-to-place, or from one field to another for the purpose of feeding livestock at the various locations.

The present invention provides a bin adapted for containing a supply of feeding materials for livestock or the like, and which can be moved from field to field where the livestock is grazing. It is desirable that the bin be as large as possible so as to contain a maximum amount of feeding materials to thereby preclude frequent filling of the bin. In moving the bin from place to place, it is sometimes necessary to travel over roads and highways and, in compliance with highway safety regulations, the bin cannot exceed a predetermined width limit. Thus, any projections extending laterally from the bin must of necessity, be removed if such projections cause the bin to have a width in excess of the maximum permissible.

Generally, feed bins for field use in feeding livestock, are provided with protective roof members overlying the feed openings thereof, and such devices are rigidly mounted to the bins at the sides thereof provided with the feed openings. Substantial time and effort are expended in removing such projecting devices prior to travel over roads and highways, and further time and effort are expended in reinstalling the devices on the bins after the same have been located in the field.

The present invention provides a bin which may be utilized for feeding livestock in the field, and which may be moved over highways, while at the same time being of a size and construction to comply with State highway regulations pertaining to maximum width limits. To this end, the present invention provides a bin having a side provided with one or a number of feed openings therein over which is disposed a protective roof member extending laterally from the side containing the feed openings. The roof member is hingedly mounted on the bin structure itself so that the roof member may be swung from the outwardly extending position thereof to a position along the side when it is desired to move the bin over a road or highway from one field to another. In addition, the present invention also provides closure means carried by the roof member for closing the opening when the roof member is extending outwardly from the side of the bin. The closure member also provides access to the feeding material carried by the bin by virtue of the fact that the closure member is hingedly mounted to the roof member and shiftable relative thereto.

It is, therefore, the primary object of the present invention to provide a feeding bin having projecting parts thereon extending laterally from the sides thereof which may be shifted to positions along the sides of the bin whereby the width of the bin is reduced without affecting the capacity of the bin itself and the same may be moved over roads and highways without violating regulations pertaining to maximum width limits.

Another object of the present invention is the provision of a protective roof structure overlying the feed openings in the side of the bin of the type described, and wherein a closure member is hingedly secured to the roof member for normally closing the opening and providing access thereto, whereby the closure member is movable with the roof member from the operative position extending outwardly from the side, to a retracted position along the side when it is desired to move the bin from field to field over roads and highways, thus obviating the assembly and disassembly of the roof member and the closure member each time it is desired to move the bin.

Still another object of the present invention is the provision of a bin of the aforesaid character which is provided with a partition therewithin disposed for mounting the roof member and providing means for metering the feeding material as the latter passes to a feeding location adjacent the opening whereby the roof member may be swung to a location disposed inwardly of the side while at the same time, the proper amount of feeding material may be delivered to the location depending upon the type of livestock to be fed and the type of feeding material to be utilized.

Yet another object of the present invention is the provision of an open top bin having a slidable panel member coupled therewith at the open top thereof, whereby feeding material may be placed within the bin when the panel is shifted to expose the open top, and the bin may be covered by the panel after having received a sufficient supply of said feeding material.

Other objects of this invention will become apparent as the following specification progresses, reference being had to the accompanying drawing, wherein:

FIGURE 1 is a perspective view of the feeding bin which forms the subject of the present invention and illustrating protective roof members projecting laterally from opposed sides thereof in overlying relationship to closure members closing corresponding openings in said sides;

FIG. 2 is an enlarged, fragmentary, cross-sectional view of the bin and illustrating the roof and closure members on one side thereof;

FIG. 3 is an enlarged, fragmentary view partially in section and partially in elevation illustrating the structure for swingably mounting the closure member and roof member on the bin; and FIG. 4 is an enlarged, fragmentary, cross-sectional view taken along line 4—4 of FIG. 2 showing a panel for closing the open top of the bin.

The bin which forms the subject of the present invention is broadly denoted by the numeral 10 and includes a hollow structure 12 having a pair of opposed sides 14, and a pair of opposed ends 16 interconnecting sides 14. The lower and major portions of sides 14 are removed to present feed openings 18 in sides 14.

Structure 12 is provided with a bottom 20 to which is secured a pair of spaced I-beams 22 which span the distance between ends 16, as is clear in FIG. 1. Beams 22 normally are supported by spaced crossbeams 24 when bin 10 is disposed in the field for feeding livestock. Legs 26, secured to beams 22, interconnect the latter and bottom 20 in the manner shown in FIG. 2. Cross bracing 28 spans the distance between legs 26 to increase the structural rigidity thereof.

An inclined partition 30 is disposed within structure 12 adjacent each side 14 as is clear in FIG. 2. The lowermost marginal edge of each partition 30 is spaced above bottom 20 to provide an aperture 32 for permitting feeding materials within structure 12 to pass onto bottom 20 adjacent the corresponding opening 18. To this end, a gauge 34 is adjustably mounted on each partition 30 adjacent the lowermost margin thereof to meter the amount of feeding material passing through aperture 32. An inverted, V-shaped materials guide 36 is disposed between partitions 30 and directs feeding materials to apertures 32.

A roof member 38 is carried by means of a hinge 40 on the outer surface of each partition 30 for swinging movement from a position projecting outwardly from side 14 to a position along side 14 and suspended from hinge 40. In FIG. 2, roof member 38 is shown in solid lines extending outwardly from partition 30 and in dashed lines between partition 30 and opening 18. When roof member 38 is in the outwardly extending position, member 38 abuts the lowermost edge 42 of side 14 which defines the upper extremity of opening 18. Supporting panels 44 are releasably secured to structure 12 and member 38 at each end of the latter for supporting member 38 in the outwardly extending position. Quick release screws 46 or the like, are utilized to readily connect and disconnect panels 44 with structure 12 and roof member 38.

A number of closure members 48 are swingably mounted by means of hinges 50 to the underside of roof member 38. To this end, each hinge 50 is secured to an angle iron 52, secured to and spanning the distance between an angle iron 54 mounted at each end of roof member 38 as is clear in FIG. 3. Closure members 48 substantially span the distance between roof member 38 when the latter extends outwardly from partition 30, and a stop 56 hingedly mounted on bottom 20. Stop 56 is disposed such that closures 48 are slightly inclined with respect to the vertical in closing relationship to opening 18. Structure may be interposed between adjacent closures 48 if desired, but the adjacent longitudinal edges of closure members 48, may be in substantial juxtaposition to substantially close opening 18 between ends 16.

Each closure member 48 is provided with an animal-engaging bar 58 interconnected to the corresponding closure member by a pair of spaced, triangular braces 60. The closure structure including closure member 48, bar 58 and braces 60, have been disclosed in my prior disclosure entitled "Animal Self-Feeder," Serial No. 102,022, filed April 10, 1961, now U.S. Letters Patent No. 3,040,707.

When roof member 38 is shifted downwardly away from edge 42 into the dashed line or retracted position, each closure member 48 shifts downwardly therewith into the dashed line position of FIG. 2. Braces 60 are preferably hingedly or removably mounted to the corresponding closure member 48 so that there are no projections on structure 12 extending laterally therefrom when each roof member 38 is in the retracted or dashed line position thereof.

Structure 12 is provided with an opening 62 in the top thereof providing a feeding materials inlet therefor. A panel 64 of sheet material is utilized for removably covering opening 62 to prevent rain, dust or the like from entering structure 12. To this end, structure 12 is provided with a pair of upwardly facing channel elements 66 at each side of opening 62, and panel 64 is provided with an elongated rod 68 rigid thereto adjacent each side edge thereof. Panel 64 is slidable over channel elements 66 with rods 68 disposed within the corresponding elements as is clear in FIG. 4 to guide panel 64 into a position closing opening 62.

A second channel element 70 overlies each channel element 66 to form with the latter, a passage for receiving the side edges of panel 64. Panel 64 is frictionally held in place in covering relationship to opening 62. The normally lowermost end of panel 64 is bent downwardly to facilitate the grasping of panel 64.

In use, structure 12 is filled to a predetermined level with feeding material for livestock, the feeding material being passed through opening 62 after panel 64 has been shifted downwardly to a position clearing opening 62.

The feeding materials gravitate toward apertures 32 and, depending upon the positions of gauges 34, a predetermined amount of the material passes through apertures 32 for deposit onto bottom 20 between the corresponding openings 18 and partitions 30. Livestock, in coming to feed at structure 12, engage bars 58 to force closure 48 inwardly to thereby gain access to the material deposited on bottom 20.

Roof members 38 overlie closure members 48 and thereby, openings 18 to protect the livestock from wind, rain, dust and dirt, while the livestock is feeding. Furthermore, roof members 38 prevent the gravitation of foreign matter into the feeding material when closure members 48 are open to expose the feeding material on bottom 20.

When it is desired to move structure 12 to a different location over a road or highway, panels 44 are quickly removed from structure 12 and roof members 38. Thereupon, roof members 38 are permitted to swing downwardly into the dashed line positions of FIG. 2 to in turn cause closures 48 also to swing to the dashed line positions. Braces 60 are then either swung toward each other or completely removed from the corresponding closure so that no projections extend laterally beyond the vertical planes of sides 14. Structure 12 may be lifted onto a vehicle and carried over a road or highway from one field to another. By virtue of the aforesaid construction of structure 12, the distance between sides 14 may be the maximum permissible on the road or highway, and the distance between ends 16 may be as long as is practical for the type of construction utilized for structure 12. Thus, it is seen that structure 12 is designed to contain the optimum quantity of feeding materials, while at the same time, structure 12 is capable of being transported over roads or highways from field to field without violating highway regulations as to maximum width limits.

After structure 12 has been moved to another field, roof members 38 may be swung to the outwardly extending positions and panels 44 affixed thereto and to structure 12. Thereupon, braces 60 may then be moved into the positions illustrated in FIGS. 1 and 2 so that livestock in the field may feed by forcing closure members 48 inwardly upon engagement with bars 58.

Having thus described the invention, what is claimed as new and desired to be secured by Letters Patent is:

1. An animal feeding bin including:
   a hollow structure adapted to receive a supply of feeding material and provided with a bottom and a substantially vertical side having an opening in the lower major portion thereof, there being an inclined partition within the structure in disposition with the upper edge of the partition abutting said side and the lower margin thereof spaced from the side and in closely spaced relationship with the bottom;
   a stop mounted on said bottom between said lower margin of the partition and the major plane of said side;
   a protective roof member hingedly connected to said partition at a point thereon in spaced relationship to said bottom and the major plane of said side for swinging movement of the roof member about a substantially horizontal axis between an inoperative position where the roof member is between the partition and the major plane of said side, and an operative position where the roof member extends outwardly from the structure through said opening; and
   an elongated closure member having opposed, upper and lower ends, said upper end being hingedly attached to the underside of said roof member adjacent said partition for pivotal movement of the closure member about a substantially horizontal axis during said swinging of the roof member, the closure member spanning the distance between the roof member and said stop with said lower end abutting the stop, said stop maintaining said lower end in greater spaced relationship from the major plane of said side than said upper end, the closure member and the stop cooperating to present a unit in closing relationship to said opening, whereby the closure member is maintained in inclined relationship with respect to said side permitting gravitational force to hold the closure member in engagement with the stop to prevent moisture and foreign particles from entering the structure.

2. The invention of claim 1, wherein said upper end of the closure member moves toward said opening and outwardly of said structure during swinging of the roof member from said inoperative position to said operative position, said lower end of the closure member slidably engaging said stop, the latter preventing substantial movement of said lower end during swinging of the roof member.

References Cited in the file of this patent

UNITED STATES PATENTS

| | | |
|---|---|---|
| 1,346,026 | Hiner et al. | July 6, 1920 |
| 2,234,112 | Emrick | Mar. 4, 1941 |
| 2,842,096 | Bradfield | July 8, 1958 |